(12) United States Patent
Guiver et al.

(10) Patent No.: US 6,605,140 B2
(45) Date of Patent: Aug. 12, 2003

(54) COMPOSITE GAS SEPARATION MEMBRANES

(75) Inventors: Michael D. Guiver, Ottawa (CA); Hoai Nam Le Thi, Hanoi (VN); Gilles P. Robertson, Hull (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/923,424

(22) Filed: Aug. 8, 2001

(65) Prior Publication Data

US 2002/0062737 A1 May 30, 2002

Related U.S. Application Data

(60) Provisional application No. 60/223,986, filed on Aug. 9, 2000.

(51) Int. Cl.[7] ............................................. B01D 53/22
(52) U.S. Cl. ........................ 96/4; 95/53; 95/55; 55/524; 55/DIG. 5
(58) Field of Search ................ 95/45, 53, 55, 95/56; 96/4, 11–14; 55/524, DIG. 5

(56) References Cited

U.S. PATENT DOCUMENTS

| | | | | |
|---|---|---|---|---|
| 4,482,360 A | * | 11/1984 | Taketomo et al. | 95/55 X |
| 4,925,459 A | * | 5/1990 | Rojey et al. | 95/55 X |
| 4,941,893 A | * | 7/1990 | Hsieh et al. | 96/12 X |
| 5,011,518 A | * | 4/1991 | Ogawa | 96/4 X |
| 5,069,794 A | * | 12/1991 | Haag et al. | 95/55 X |
| 5,156,656 A | * | 10/1992 | Parker et al. | 96/12 X |
| 5,356,459 A | * | 10/1994 | Bikson et al. | 95/55 X |
| 5,507,860 A | * | 4/1996 | Rao et al. | 95/55 X |
| 5,871,650 A | * | 2/1999 | Lai et al. | 95/55 X |
| 5,942,119 A | * | 8/1999 | Deckman et al. | 95/55 X |
| 6,074,457 A | * | 6/2000 | Anthonis et al. | 96/11 X |
| 6,090,289 A | * | 7/2000 | Verduijn et al. | 96/11 X |
| 6,193,784 B1 | * | 2/2001 | Yazawa et al. | 96/11 X |

* cited by examiner

*Primary Examiner*—Robert H. Spitzer
(74) *Attorney, Agent, or Firm*—George A. Seaby

(57) ABSTRACT

A polysulfone-zeolite composite membrane can be used to separate gas pairs such as hydrogen/carbon dioxide. Zeolite, preferably zeolite 3A particles are covalently bonded to the polymer using an aminofunctional methoxysilane as a coupling agent to bind the zeolite particles to an aldehyde modified polysulfone matrix.

15 Claims, 5 Drawing Sheets

COMPOSITE GAS SEPARATION MEMBRANES

This application claims the benefit under 35 U.S.C. 119(c) of provisional application Ser. No. 60/223,986, filed on Aug. 9, 2000, which provisional application is hereby incorporated by reference in its entirety.

BACKGROUND OF THE INVENTION

This invention relates to a composite gas separation membrane and to a process for preparing such a membrane.

Specifically, the invention relates to a composite polysulfone-zeolite membrane for separating hydrogen from a hydrogen/carbon dioxide mixture, and to a process for preparing the membrane.

In some industrial processes such as the production of hydrogen for fuel cells or hydrogenation, or pharmaceutical processes such as enzymatic catalyzed reactions there is a need for the removal or recovery of hydrogen from a mixture containing hydrogen and carbon dioxide without a phase change. (G. Härtel et al, Separation of a $CO_2/H_2$ gas mixture under high pressure with polyethylene terephthalate membranes, J. Membrane Sci. 113 (1996), 115–120 and G. Härtel et al, Permselectivity of a PA6 membrane for the separation of a compressed $CO_2/H_2$ gas mixture at elevated pressures, J. Membrane Sci. 162 (1999) 1–8). Although membrane technology has gained acceptance in some gas separation applications, the separation of hydrogen from carbon dioxide is difficult to accomplish using membranes derived from traditional polymers. This is because hydrogen and carbon dioxide both have high permeability coefficients compared with other gases such as methane, nitrogen and oxygen. Typically, the hydrogen/carbon dioxide separation factor [ISF] is rather low for many glassy polymers, e.g., in the vicinity of 2–3 (G. C. Kapantaidakis et al, Gas permeation through PSF-PI miscible blend membranes, J. Membrane. Sci., 110 (1996) 239–247; A. Alentiev et al, Gas permeation properties of phenylene oxide polymers, J. Membrane Sci., 138 (1998) 99–107, and Y. Shindo et al, Calculation methods for multicomponent gas separation by permeation, Sep. Sci. Tech., 20(5 & 6) (1985) 445–459). Similar ISF values are observed when a mixture of hydrogen and carbon dioxide is used. Only a limited number of studies can be found on the application of membranes to the separation of hydrogen and carbon dioxide gas mixtures. For example, Härtel et al (G. Härtel et al, Separation of a $CO_2/H_2$ gas mixture under high pressure with polyethylene terephthalate membranes, J. Membrane Sci. 113 (1996), 115–120 used a polyethylene terephthalate membrane to separate a 50/50 volume mixture of hydrogen and carbon dioxide. The separation was done under a high feed pressure (70 bar) with a 4 bar differential pressure and they were able to achieve a selectivity of around 4 at steady-state under the given conditions.

On the other hand, the advantage of composite membranes comprising glassy polymersand molecular sieves are evidenced in many studies such as T. M. Gür, Permselectivity of zeolite filled polysulfone gas separation membranes, J. Membrane Sci. 93 (1994) 283–298; C. Joly et al, Sol-gel polyimide-silica composite membrane; gas transport properties, J. Membrane Sci. 130 (1997) 63–74; M. G. Süer et al, Gas permeation characteristics of polymer-zeolite mixed matrix membranes, J. Membrane Sci. 91, (1994) 77–86; M. Smaihi et al, Gas separation properties of hybrid imide-siloxane copolymers with various silica contents, J. Membrane Sci. 161 (1999) 157–170 and C. M. Zimmerman et al, Tailoring mixed matrix composite membranes for gas separations, J. Membrane Sci. 137 (1997) 145–154. Zeolite and carbon molecular sieves have shown favorable effects for this application. Ideally, hydrogen passes through the well-defined channels of a proper molecular sieve such as zeolite 3A, while the permeation of carbon dioxide is hindered because of its larger molecular size. From the data of Lennard-Jones (L. M. Robeson, Correleation of separation factor versus permeability for polymeric membranes, J. Membrane Sci. 62 (1991) 165–185), the kinetic diameters of the two gases are $H_2$=2.89 Å and $CO_2$=3.3 Å. Since the diameter of $H_2$ is less than that of the well-defined and uniform zeolite 3 Å pores, and the diameter of $CO_2$ is larger, an increase in the selectivity is expected for $H_2/CO_2$ if the gas mixture diffuses through the zeolite pores. For an enhanced separation to work in practice, all or most of the hydrogen molecules must pass through the zeolite channels rather than the voids between the zeolite and the polymer matrix. Such voids often occur due to the poor adhesion of zeolite particles to the polymer matrix.

There have been a number of attempts to incorporate zeolite into polymer matrices in order to improve membrane separation (M. G. Süer et al, Gas permeation characteristics of polymer-zeolite mixed matrix membranes, J. Membrane Sci. 91, (1994) 77–86 and T. M. Gür, Permselectivity of zeolite filled polysulfone gas separation membranes, J. Membrane Sci. 93 (1994) 283–298). As described in D. W. Breck, Zeolite Molecular Sieves, John Wiley, New York. 1974; R. Szostak, Molecular Sieves; Principles of Synthesis and Identification, Blackie Academic & Professional, London, Second edition 1998 and M. E. Davis, The quest for extra-large pore, crystalline molecular sieves, Chem. Eur. J.3 (11)(1997) 1745–1750, zeolites have different structural types with pore sizes ranging from small (3 Å) to extra-large (15 Å). The addition of zeolite into a continuous polymer phase induces a microporous cavity and channelling system of a defined size in the zeolite-polymer composite membrane. Significant differences in measured permeability and calculated selectivity values demonstrate the importance of the type and percentage of zeolite. Permeabilities and selectivities are enhanced at high zeolite loadings in the polymer matrix with zeolites 13X and 4A for $H_2/N_2$ and $CO_2/N_2$ gas separations (M. G. Süer et al, Gas permeation characteristics of polymer-zeolite mixed matrix membranes, J. Membrane Sci. 91, (1994) 77–86), but there is no performance increase for $H_2/CO_2$. Gurkan et al (T. Gurkan et al, A new composite membrane for selective transport of gases, Proc. 6th Int. Symp. Synthetic Membranes in Science and Industry, Tubingen, Germany, August 1989) reported the separation of $O_2/N_2$ and $H_2/N_2$ gas pairs using a zeolite 13X-polysulfone membrane made by extrusion. A substantial increase in permselectivities was observed when compared with pure polysulfone.

One problem associated with zeolite—glassy-polymer composite membranes is the formation of voids around the zeolite particles due to poor adhesion of the polymer to the external zeolite surface (see I. E. J>Vankelecom et al, Incorporation of Zeolites in Polyimide Membranes, J. Phys. Chem., 99(35), (1995) 13187–13192).

SUMMARY OF THE INVENTION

An object of the present invention is to provide a solution to the above-identified problem in the form of a functionalized glassy polymer for separating gas pairs, i.e. gases containing molecules of two different types.

Another object of the invention is to provide polysulfone-zeolite composite membrane for separating a gas pair such as hydrogen/carbon dioxide by exploiting the well defined and substantially uniform zeolite pores for selective diffusion of one member of the gas pair, namely hydrogen in the $H_2/CO_2$ pair.

In a specific embodiment of the invention, the use of zeolite 3A (pore size of about 3 angstroms) as a molecular sieve has been found to provide results differing from those in some previous reports where the zeolite pore size permits passage of both gases. For example, zeolite 5A for $CO_2/CH_4$ separation showed no change in selectivity (J. M. Duval et al in Adsorbent filled membranes for gas separation. Part 1 (Improvement of the gas separation properties of polymeric membranes by incorporation of microporous adsorbents, J. Membrane Sci. 80 (1993) 189–198), 70% silicalite filled PDMS membranes used for $O_2/N_2$ separation showed a modest selectivity increase (M. Jia, et al, Molecular sieving effect of the zeolite-filled silicone rubber membranes in gas permeation, J. Membrane Sci. 57 (1991) 289–296). Zeolite 13X used for separating several different gases showed either no pronounced effect (T. M. Gur, supra) or some enhancement in permselectivity (M. G. Suer et al, supra).

In order to enhance the membrane selectivity, the inventors provide a method for covalently attaching zeolite particules to the polymer chain, thereby reducing or eliminating the presence of void spaces between the two phases. This is achieved using an aminofunctional methoxysilane as a coupling agent to bind the zeolite particles to an aldehyde modified polysulfone matrix. It is believed that the aldehyde functional group of the polymer reacts with the amino group of the coupling agent which itself binds to the zeolite surface by reaction of silyl ether with zeolite-OH as shown in the reaction scheme of FIG. 1. Membrane preparation conditions and the factors affecting gas permeation and permselectivity are determined using a zeolite 3A molecular sieve composite membrane.

DETAILED DESCRIPTION OF THE INVENTION

Materials

Figure 1:
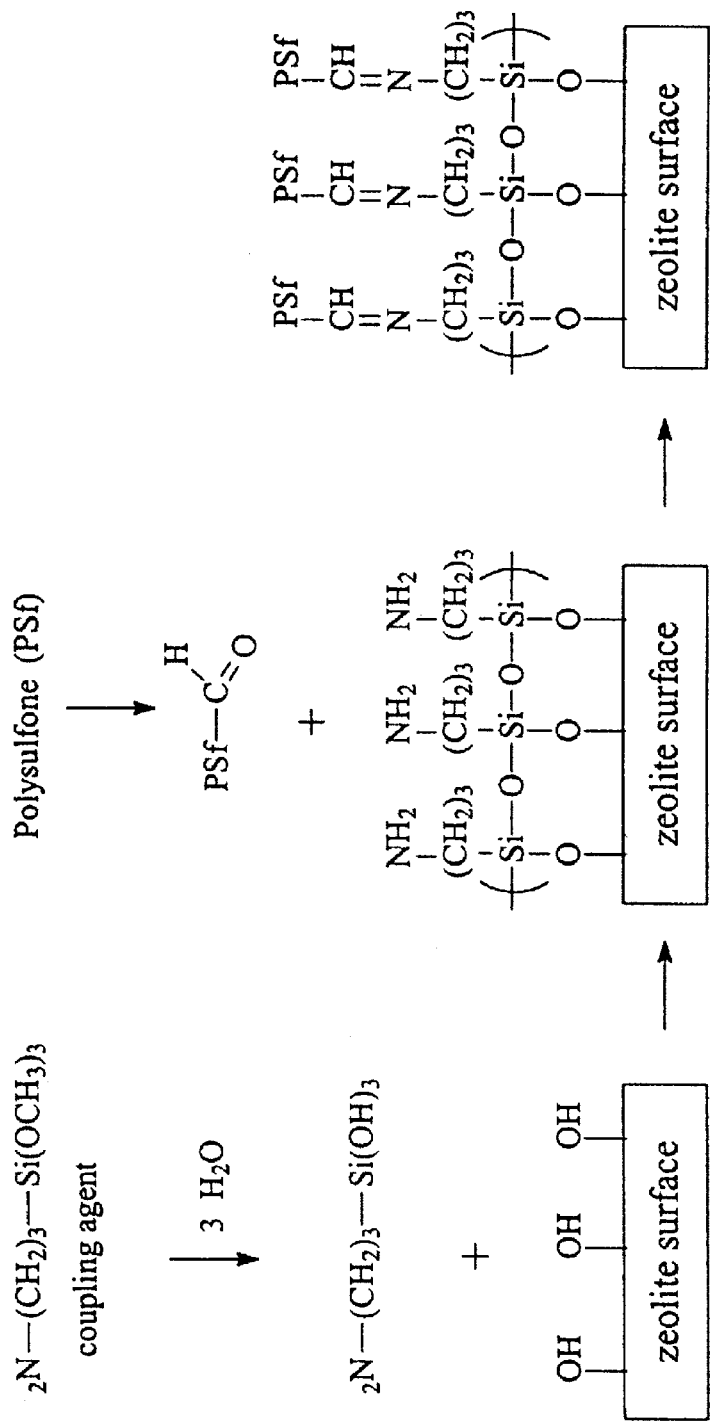
FIG. 1 is a reaction scheme for the method of the present invention.

Polysulfone aldehyde (PsfCHO) was produced from commercial Udel P-3500® polysulfone (Psf) (Amoco Performance Products, Inc.) by lithiation using the method described in M. D. Guiver, et al in Chapter 10: Functionalized Polysulfones: Methods for Chemical Modification and Membrane Applications, Membrane Formation and Modification, I. Pinnau and B. D. Freeman, Eds., ACS Symp. Ser 744, American Chemical Society, Washington D.C. 1999. pp 137–161; M. D. Guiver et al, Preparation of substituted polysulfones through orthometalated intermediates, U.S. Pat. No. 4,797,457 (1989) and M. D. Guiver et al, The modification of polysulfone by metalation, J. Polym. Sci., Polym. Lett. Ed., 26, (1988), 123–127. Following lithiation, the aldehyde was reacted with a formyl equivalent electrophile. The polymer had a degree of substitution (DS) of 0.30 aldehyde groups per repeat unit; in other words, approximately one aldehyde group for every three repeat units. PsfCHO was used as the matrix material for the composite membrane. Psf was used for making comparative membranes. Zeolite 3A (molecular sieve powder, Aldrich) which has a pore size of 3 Å and composition $K_{12}[(AlO_2)_{12}(SiO_2)_{12}] \cdot xH_2O$ (type LTA) was used as the filler and the coupling agent was aminopropyltrimethoxysilane (97%) $H_2N(CH_2)_3Si(OCH_3)_3$ (Aldrich).

Membrane Preparation

Preparation of the Psf and PsfCHO homogeneous dense films.

All polymer solutions were prepared from chloroform and were filtered to eliminate particles. The solutions were poured onto a mirror plate glass dish (10 cm diameter) and allowed to evaporate to dryness at ambient temperature in a dry nitrogen atmosphere. The films were dried in a vacuum oven at the desired temperature overnight to remove all solvent before permeation experiments.

Zeolite-filled composite membranes with or without coupling agent. Commercial molecular sieve 3A powder was dried at 500° C. for 4 hours, then ground in a mortar and pestle. Zeolite filled membranes were prepared as above except that zeolite with or without coupling agent was dispersed in the solvent for 2 hours before adding the suspension to a pre-dissolved filtered polymer solution and stirring the mixture for an additional 2 hours. The polymer concentration was a controlling factor for the zeolite sedimentation rate during membrane formation. The zeolite loading in composite membranes was calculated as the weight percentage of zeolilte relative to the total weight of the membrane, excluding coupling agent. The coupling agent was used with the expection of covalent attachment between polymer matrix and zeolite surface. A 25 wt % ratio of coupling agent to polymer was normally employed, corresponding to an approximate molar ratio of 2:1 coupling agent to polymer CHO groups. After casting and evaporation at ambient temperature, the membranes were heated at various temperatures for 24 hours to give strong flexible membranes that were not brittle.

The following examples illustrate the method of the present invention.

EXAMPLE 1

A membrane was prepared by stirring a suspension of 0.7 g zeolite 3A in 5 mL of chloroform for 2 h, and then adding 0.25 g of aminopropyltrimethoxysilane and stirring for a further 2 h. The resulting suspension was added to a solution of 1 g PsfCHO in 10 mL of chloroform and stirred for 2 h. Then the mixture was poured onto a 10 cm diameter glass dish. The solvent was allowed to evaporate at ambient temperature for one day, and the resulting membrane was heated at 40° C. for 2 h, then 60° C. for 2 h before removal from the glass surface by immersion in water. The composite membrane, which was placed in a vacuum oven for 24 h to remove any solvent or water, was tough and flexible.

EXAMPLE 2

2.0 g of zeolite (3A, undried from bottle, ground for 10 minutes) and 2.0 mL of coupling agent (3-aminopropyltrimethoxysilane) were refluxed in a 250 mL round-bottom flask with medium speed stirring in 100 mL chloroform for 16 hours, and then cooled to room temperature. The reflux setup consisted of a condenser with a dessicant tube and an argon inlet providing positive pressure. A solution of 2.0 g of polysulfone aldehyde (degree of substitution 0.3) in 75 mL of chloroform was then added to the zeolite/coupling agent mixture and stirred at medium speed for two hours. The volume of the solvent was reduced using a rotary evaporator at 30° C. until the volume of the remaining solution was approximately 50–75 mL. The remaining solution was mixed for a short time to disperse the zeolilte before the solution was cast onto two flat-glass moulds with radii of 10.5 cm. The films were allowed to dry at room temperature in a level, enclosed environment flushed with approximately 10 cc/min argon. 24 hours after casting, the films were initially dried and cured in an oven at 75° C. for 24 h, then further dried in a vacuum oven at 60° C. for 24 h.

While chloroform was used as the solvent in the preparation of the membranes, it will be appreciated that any solvent which will dissolve and not react adversely with the polymer can be used.

Gas Permeability Measurements (Method)

Hydrogen and carbon dioxide gas permeability measurements were made at 22° C. using a constant volume apparatus. The effective membrane area in the test cell was 13.85 cm$^2$. The upstream gas pressures were 2000, 4000 and 5500 torr, (38.7, 77.4, and 106.4 psi, respectively). The downstream side was initially under vacuum (~10$^{-4}$) and rose to 100 torr as the permeating gas was collected in the downstream volume. Simultaneously, the upstream pressure was automatically adjusted to compensate for the downstream pressure rise. Consequently, the differential pressure remained the same throughout each experiment.

For example 2 product, the films were cut to size then vacuumed in the gas permeation system overnight before running any permeation tests. Hydrogen tests were run for several hours to ensure steady state, then the films were vacuumed before running CO$_2$ tests. CO$_2$ tests were run for 4 days to ensure steady-state was achieved.

The data aquisition and process control was implemented by a computer program. The permeation rates of gases were calculated automatically by the program according to the slope of the downstream pressure versus time curve. The individual gas permeation was evaluated by equation (1), which is formed from Fick's law of diffusion and Henry's law.

$$P_i = J_i l / \Delta P \qquad \text{equation 1}$$

wherein, $P_i$ is the permeability coefficient, Barrer (10$^{-10}$ cm$^3$ (STP) cm/cm$^2$ s cmHg), $J_i$ is flux (cm$^3$/cm$^2$ s), $\Delta P$ is the pressure difference across the membrane (cmHg), and l is thickness of the membrane (cm).

The ideal separation factor, α, is defined (equation 2) as the ratio of the individual component permeabilities:

$$\alpha = P_i / P_j \qquad \text{equation 2}$$

Membrane Characterization
FTIR Spectroscopy

FTIR was used to explore the interaction between zeolite, coupling agent and PsfCHO. The FTIR-spectra of individual samples and mixed samples were obtained with a MIDAC M1200 SP3 spectrometer at 4 cm$^{-1}$ resolution (DTGS detector, 50 scans averaged for each spectrum). Membrane spectra were obtained by direct transmission IR, as were powders after pressing into KBr pellets. The liquid coupling agent was run as a solvent-free film on a Ge reflection element by attenuated total internal reflection (ATR). ATR-IR spectra were corrected for varying depth of beam penetration with the spectrometer's GRAMS/32 software and so are directly comparable with transmission spectra.

The IR spectra of zeolite, coupling agent and the reaction mixture of zeolite with coupling agent are compared in FIG. 1. The zeolite 3A has a spectrum similar to kaolin, a hydrated, alumina/silica mineral, with distinctive peaks at ~1080, 550 and 480 cm$^{-1}$ (R. A. Nyquist and R. O. Kagel, Infrared spectra of inorganic compounds, Academic Press, New York, 1971). The 3440 and 1654 cm$^{-1}$ peaks result from bound water. The coupling agent shows the 1078 cm$^{-1}$ peak typical of the C—O—Si group and the sharp C—H peak of the Si—O—CH$_3$ group at 2838 cm$^{-1}$ (FIG. 1—spectrum B) (L. J. Bellamy, The infrared spectra of complex molecules, Methuen, London, 1954, and C. J. Pouchet, Aldrich library of infrared spectra, edition III, Aldrich Chemical Company, 1981). The amino group (at ~3300 cm$^{-1}$) is only visible at higher scale expansions. In contrast, after the mixing of the zeolite and the coupling agent, the methyl C—H peak is no longer visible, consistent with methanol elimination in the reaction scheme (FIG. 1). In addition, the 1078 cm$^{-1}$ peak is largely missing, as the Si—O—C links are replaced by Si—O—Si bonds (broad adsorption from 1110 to 1000 cm$^{-1}$), both between the coupling agent and the zeolite and in self reactions (L. J. Bellamy, The infrared spectra of complex molecules, Methuen, London, 1954, and C. J. Pouchet, Aldrich library of infrared spectra, edition III, Aldrich Chemical Company, 1981). The 2930 cm$^{-1}$ peak visible in the product is attributable to the —CH— absorption of the imine group (see E. Pretsch et al, Tables of Spectral Data for Structure Determination of Organic Compounds, Springer-Verlag. Berlin Heidelberg, 1983).

Figure 2:
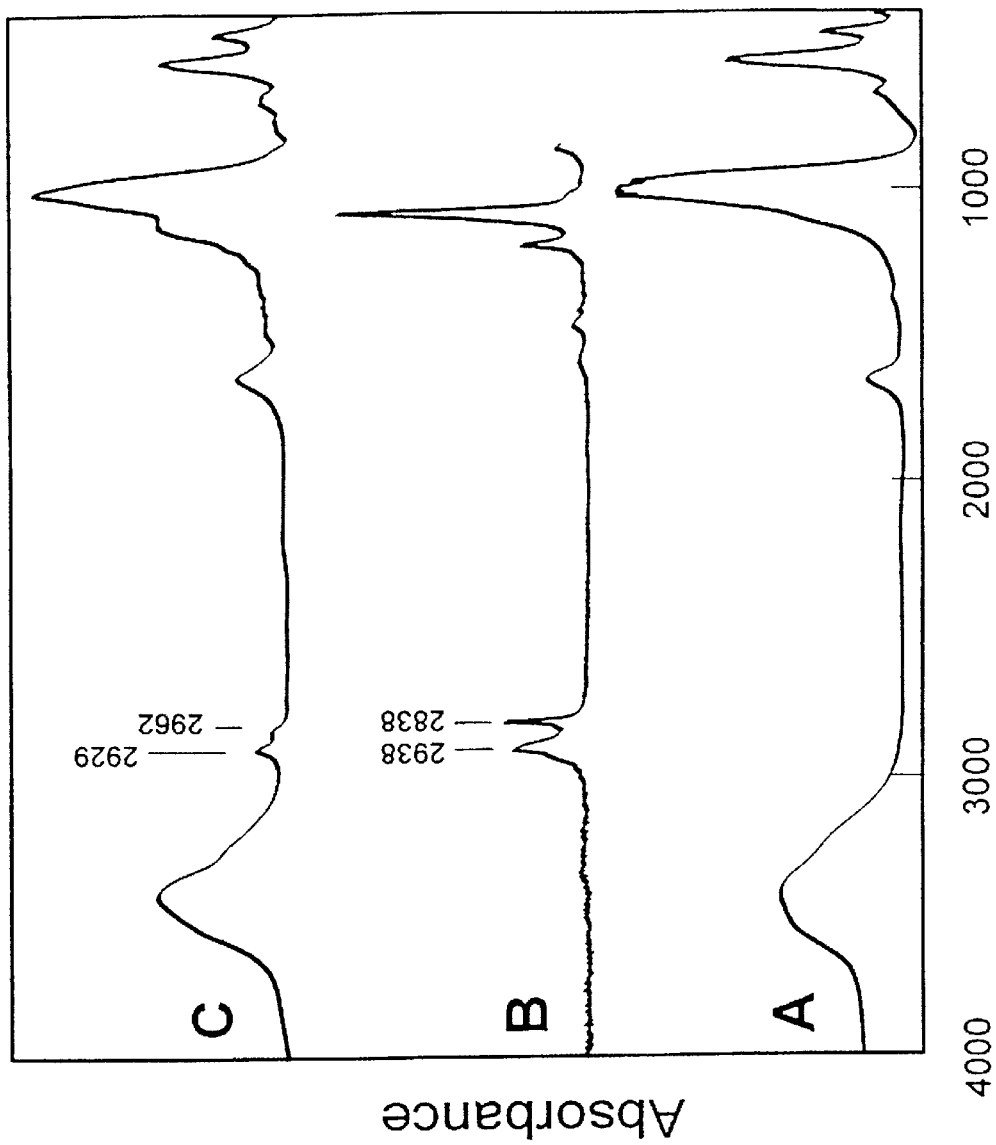
FIG. 2 shows comparative FTIR spectra of zeolite 3A, aminopropyltrimethoxysilane (APTS) coupling agent, and zeolite reacted with the coupling agent.

In FIG. 2, FTIR spectra of Psf, PsfCHO, PsfCHO+coupling agent, and PsfCHO+coupling agent+zeolite are compared. Only the spectrum of PsfCHO (FIG. 2—spectrum B) shows an absorption peak at 1697 cm$^{-1}$, ascribed to C=O stretch of the —PsfCHO+coupling agent or PsfCHO+coupling agent+zeolite, consistent with the polymer's aldehydic group having reacted with amino group of the coupling agent. The small peak visible at 1633 cm$^{-1}$ spectra C and D in FIG. 2 is consistent with imine formation, but is not conclusive proof.

Figure 3:
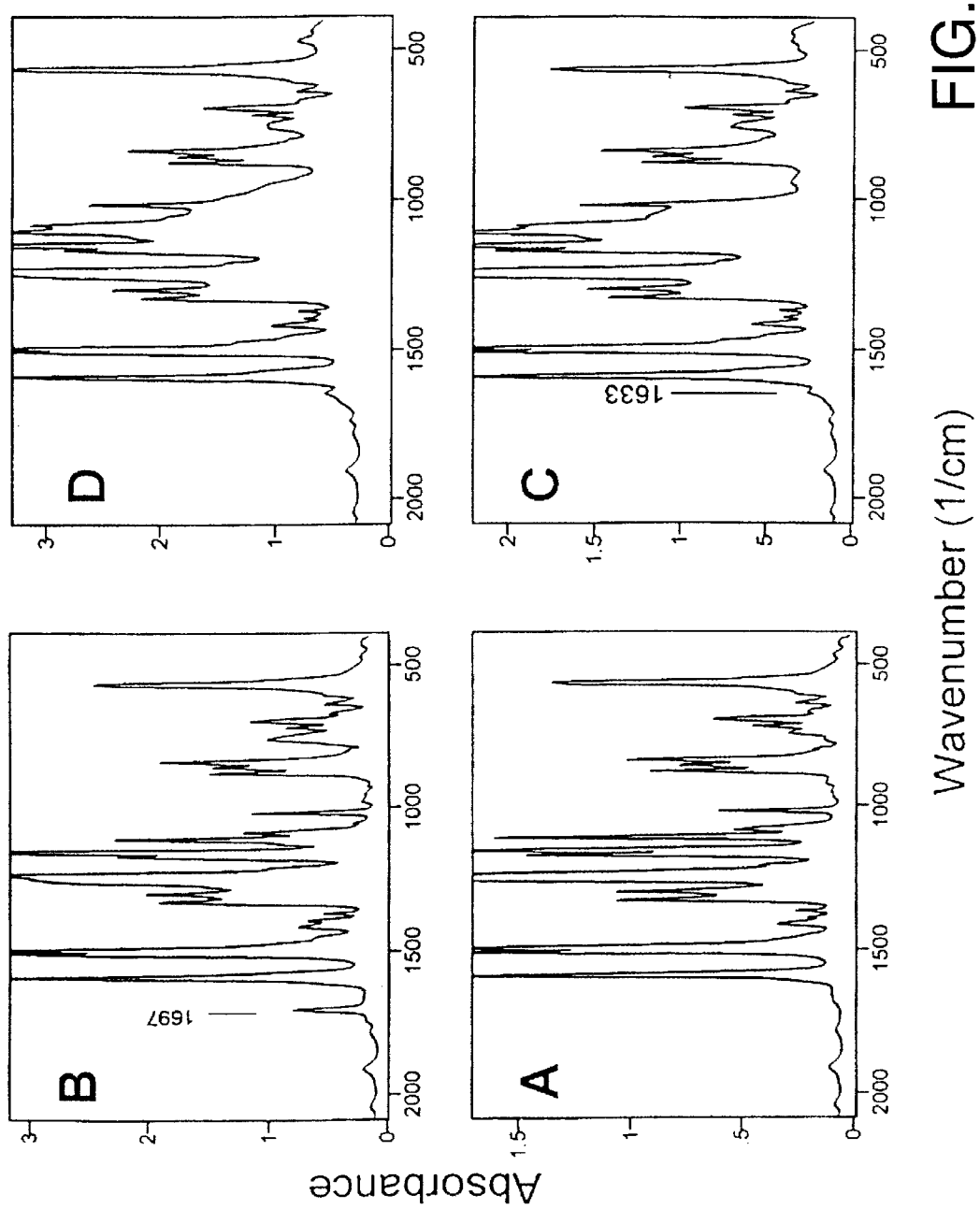
FIG. 3 shows comparative spectra of Psf, PsfCHO, PsfCHO reacted with APTS, and PsfCHO reacted with APTS and zeolite (2000–1500 $cm^{-1}$)

The full spectrum of PsfCHO-coupling agent—zeolite composite membrane from 4000 cm$^{-1}$ to 400 cm$^{-1}$ is shown in FIG. 3. Based upon the IR result, and reported reactivities (J.-M. Duval et al supra and E. P. Pluedemann, Silicone coupling agents, 2nd Ed., Plenum Press New York, 1991), the inventors believe that the mechanism of interaction between zeolite, coupling agent and PSfCHO polymer is most likely as outlined in the reaction scheme (FIG. 1).

Gas Permeability Measurements (Results)

The zeolite composite membranes were tested with two gases: H$_2$ and CO$_2$. Both of these are considered "fast gases", and consequently do not usually exhibit a high H$_2$/CO$_2$ ideal separation factor. Since the zeolite 3 Å pore size is larger than the kinetic diameter of hydrogen and smaller than that of carbon dioxide, an enhanced selectivity would be obtained if zeolite 3A is used as the separation medium. Accordingly, a large selectivity increase in a polymer/zeolite membrane would imply that voids between the composite phases were either absent or considerably reduced. All permeation measurements were made at room temperature, ~22° C.

Membrane formulations and preparation conditions, as well as the permeabilities and permselectivities of the resulting zeolite-free and zeolite filled membranes prepared in accordance with Example 1 are summarized in Table 1.

these films and no practical separation is expected between $H_2$ and $CO_2$ if a gas mixture is used.

TABLE 1

| Membrane designation | | Membrane preparation conditions | | | | Permeability measurements | | | |
|---|---|---|---|---|---|---|---|---|---|
| N | Membrane | Polymer conc. (g/L) | Treatment temp. (° C.) | Zeolite loading (Wt %) | Coupling agent | ΔP (torr) | ªP ($H_2$) (Barrer) | ªP ($CO_2$) (Barrer) | $H_2/CO_2$ |
| 1 | PSf (M10) | 50 | 60 | 0 | No | 2000 | 13.9 | 8.8 | 1.6 |
| | | | | | | 4000 | 12.8 | 8.1 | 1.6 |
| | | | | | | 5500 | 13.1 | 8.1 | 1.6 |
| 2 | PSf (M14) | 70 | 90 | 0 | No | 2000 | 41.8 | 22.8 | 1.8 |
| | | | | | | 4000 | 23.8 | 8.5 | 2.8 |
| | | | | | | 5500 | 18.8 | 6.9 | 2.7 |
| 3 | PSf (M18) | 100 | 90 | 0 | No | 2000 | 11.9 | 5.8 | 2.1 |
| | | | | | | 4000 | 10.5 | 4.6 | 2.3 |
| | | | | | | 5500 | 10.3 | 4.8 | 2.1 |
| 4 | PSf (M27) | 133 | 90 | 0 | No | 2000 | 7.3 | 4.7 | 1.6 |
| | | | | | | 4000 | 5.8 | 3.6 | 1.6 |
| | | | | | | 5500 | 5.6 | 3.8 | 1.5 |
| 5 | PSfCHO (M17) | 50 | 60 | 0 | No | 2000 | 7.4 | 4.2 | 1.8 |
| | | | | | | 4000 | 6.7 | 3.8 | 1.8 |
| | | | | | | 5500 | 7.1 | 3.9 | 1.8 |
| 6 | PSfCHO (M19) | 100 | 90 | 0 | No | 2000 | 8.2 | 4.3 | 1.9 |
| | | | | | | 4000 | 7.7 | 4.3 | 1.8 |
| | | | | | | 5500 | 7.7 | 4.2 | 1.8 |
| 7 | PSfCHO-3A (M4) | 73 | 60 | 24 | No | 2000 | 120.2 | 75.1 | 1.6 |
| | | | | | | 4000 | b | b | b |
| | | | | | | 5500 | b | b | b |
| 8 | PSfCHO-3A (M5) | 35.6 | 60 | 24 | Yes | 2000 | 38.2 | 18.1 | 2.1 |
| | | | | | | 4000 | 43.3 | 18.2 | 2.4 |
| | | | | | | 5500 | 57.4 | 24.2 | 2.4 |
| 9 | PSfCHO-3A (M24) | 50 | 60 | 41 | Yes | 2000 | 18.2 | 1.4 | 13 |
| | | | | | | 4000 | 18.0 | 1.4 | 13 |
| | | | | | | 5500 | b | b | B |
| 10 | PSfCHO-3A (M8, M21) | 70 | 60 | 24 | Yes | 2000 | 14.2 | 4.7 | 3.0 |
| | | | | | | 4000 | 14.2 | 5.1 | 2.8 |
| | | | | | | 5500 | 14.2 | 5.0 | 2.8 |
| 11 | PSfCHO-3A (M22) | 70 | 60 | 33.3 | Yes | 2000 | 12.4 | 1.0 | 12 |
| | | | | | | 4000 | b | b | b |
| 12 | PSfCHO-3A (M28) | 70 | 60 | 41 | Yes | 2000 | 15.2 | b | b |
| | | | | | | 4000 | 14.4 | 0.4 | 36 |
| | | | | | | 5500 | 14.3 | 0.4 | 36 |
| 13 | PSfCHO-3A (M31) | 70 | 60 | 50 | Yes | 2000 | 135 | 10.6 | 12.7 |
| | | | | | | 4000 | 136 | 10.7 | 12.7 |
| 14 | PSf-3A (M13) | 35.6 | 60 | 24 | Yes | 2000 | 11.2 | 5.2 | 2.2 |
| | | | | | | 4000 | 10.8 | 5.0 | 2.2 |
| | | | | | | 5500 | 10.4 | 4.8 | 2.2 |
| 15 | PSfCHO-5A (M32) | 70 | 60 | 41 | Yes | 2000 | 32.6 | 11.9 | 2.73 |
| | | | | | | 4000 | 31.1 | 11.3 | 2.74 |

ªP is the permeability coefficient in Barrer (1 Barrer = $10^{-10}$ cm$^3$ (STP). cm. cm$^{-2}$. s$^{-2}$ cm Hg$^{-1}$)
b no measurement made As a baseline from which to compare all results, single gas permeability coefficients were measured for four unfilled Psf dense films (N1–N4) prepared from different polymer concentrations (5–13%) and treated at two temperatures (60 and 90° C.). Permeability data and ideal permselectivity for N1 (Psf:P($H_2$) 14, $H_2/CO_2$ 1.6) are similar to those reported by others (Psf:P($H_2$) 13.2, $H_2/CO_2$ 2.0) (T. M. Gur, Permselectivity of zeolite filled polysulfone gas separation membranes, J. Membrane Sci. 93 (1994) 283–298 and J. M. Mohr et al, Surface fluorination of polysulfone asymmetric membranes and films, J. Membrane Sci. 56 (1991)). With the exception of $N_2$ membrane, all samples showed ISFs between 1.6 and 2.1, with $H_2$ permeability coefficients of 5.6 to 13.9 Barrer. Unexpectedly higher permeability and permselectivity were obtained for film N2 prepared from 7% polymer treated at 90° C. For films N1–N4, the general trend of the variations of permeability and ISF with respect to polymer concentration suggests that an optimum polymer concentration exists at which both permeability and ISF are maximized. However, the ISF variation is insignificant for The permeability coefficients of the experimental gases through unfilled PsfCHO polymer dense films N5 and N6 were approximately 40% less than Psf film N1, and with slightly increased permselectivities. The presence of polar aldehyde groups in the polymer increases inter-chain interactions, and possibly gives a more dense and rigid matrix.

Composite membrane N7, prepared from PsfCHO-zeolite without coupling agent has a sedimented zeolite morphology containing voids around the particles. In this case, permeability coefficients are 15–17 times greater than PsfCHO, but the selectivities are in the same range as the unfilled membrane N6. Thus, selectivity enhancement from molecular sieves could not be observed, because there was not adequate adhesion of the zeolites to the polymer matrix. Gases diffuse rapidly through the void cavities instead of through the zeolite pores.

Membrane samples N8 to N13 were prepared from PsfCHO and zeolite with the addition of coupling agent. These samples are shown in the order of increasing polymer concentration in Table 1. Membrane samples N8 was prepared from a low polymer concentration of 3.56% (35.6 g/L) and zeolite loading of 24 wt %. While the ISF of N8 was improved compared with that of N7, the permeability coefficient was reduce threefold. However, compared with Psf alone (samples N1–N4) the improvement was minor. In other words, although the addition of zeolite slightly enhanced the ISF, the low zeolite loading allowed for permeation of both $H_2$ and $CO_2$ in the polymer matrix.

The polymer casting solution concentration and zeolite loading were increased in sample N9. As a result, a significant enhancement was observed in both permeability coefficient and ISF. In comparison with PSf films (N1–N4) the permeation of $CO_2$ decreased by 60–85%, while $H_2$ permeability increased resulting in a considerable enhancement in the ISF of the membrane. This result is another indication of the strong adhesion of the polymer matrix to the zeolite particles which eliminates the voids and prevents the leakage of gases through such defects. Therefore, while the zeolite pores enhanced the passage of hydrogen, the permeation of carbon dioxide was considerably impeded.

Increasing the polymer concentration and decreasing the zeolite loading caused a decrease in permeability and in the ISF in N10 compared with N9. It is likely that this result is due to the lower relative ratio of zeolite to polymer. This observation emphasizes the major role of zeolite in the enhancement of the membrane permeability and selectivity. On the other hand, the N10 results can be compared with those of N7. While both polymer concentration and zeolite are approximately the same, the difference is the absence of coupling agent in N7 and its presence in N10. Obviously, the improved performance of N10 is due to the different membrane structure brought about by the addition of coupling agent.

The polymer concentration of the N11 sample was kept constant compared with N10, but the zeolite loading was increased to 33.3 wt %. The $H_2$ permeability coefficient declined slightly but the ISF sharply increased to a value comparable with N9. The comparison between samples N9, N10, and N11 reveals that the zeolite loading plays a key role in the enhancement of the membrane performance.

It is apparent from the results of membranes N8-N11 that a higher zeolite loading in the range of 33–41% leads to an enhanced ISF. A membrane N12 was prepared containing 41% zeolite loading similar to N9, but using a higher polymer concentration to impede the zeolite sedimentation rate. The ISF value of N12 membrane was 36, considerably higher than N9. A possible reason for the high ISF is that zeolite particles are well dispersed throughout the thickness of the membrane, and the majority are well encapsulated and bonded with polymer.

A further increase in the zeolite loading in N13 decreased the ISF to values similar to N9, but resulted in a much higher $H_2$ permeability coefficient. It appears that at high zeolite loading, the particles come in direct contact with each other without polymer being allowed to penetrate in the void spaces between them. Therefore, an increasing trend of ISF with zeolite loading cannot occur unless all the individual zeolite particles are bonded and coated with polymer.

In order to emphasize the effect of both aldehyde and coupling agent on the elimination of the voids, a single test was performed using the coupling agent but without the aldehyde. The results are shown as sample N14 that is comparable in formulation to N8, except in polymer functionality. The zeolite loading chosen for the comparative test was too low to demonstrate a significant effect on ISF.

The effect of a larger pore zeolite was studied using zeolite 5A instead of 3A at optimum polymer concentration and zeolite loading, i.e., comparable conditions as N12. The results are shown as N15 in Table 1. The larger channels of 5A type zeolite allowed for the permeation of both experimental gases, which resulted in a sharp decrease in the membrane ISF. While the permeability coefficient of both gases increased through 5A zeolite, the ISF loss was due to the more pronounced increase in the $CO_2$ permeability.

From the foregoing, it is apparent that an optimum zeolite loading exists at ~40 wt % at which the membrane ISF is the highest, while having good permeability values. At a higher zeolite loading of 50%, the ISF decreases, but $H_2$ permeability increases.

The optimum results obtained by the inventors can also be compared with those reported in the literature as shown in Table 2.

TABLE 2

| Ref. | Membrane type | Δp (psi) | $^aP (H_2)$ | $^aP (CO_2)$ | ISF |
|---|---|---|---|---|---|
| N13 | PSfCHO-Zeolite 41% | ~80 | 14.4 | 0.4 | 36 |
| N14 | PSfCHO-Zeolite 50% | ~40 | 135 | 10.6 | 12.7 |
| A | Udel/P-1700 (PSf) | 100 | 13.2 | 6.5 | 2.0 |
| A | Udel/13x 10 vol % | 100 | 14.4 | 6.1 | 2.4 |
| A | Udel/13x 20 vol % | 100 | 14.7 | 6.1 | 2.4 |
| B | PSf | | 12.6 | 5.3 | 2.4 |
| C | PSf | | 14.0 | 5.6 | 2.5 |
| D | PET (mixed gas) | ~60 | 5.3 | 1.3 | 4.1 |
| E | PPO | ~30 | 80 | 27 | 3.0 |
| E | PPO | ~30 | 28 | 32 | 0.9 |
| F | PI | ~45 | 4.4 | 1.8 | 2.4 |
| F | PI/Silica | ~45 | 9.0 | 2.8 | 3.2 |
| G | PES | 100 | 6.5 | 2.6 | 2.5 |
| G | PES/4A 25 wt % | 100 | 4.5 | 1.6 | 2.8 |
| G | PES/13X 8.3 wt % | 100 | 3.8 | 1.5 | 2.5 |
| H | Silica 400 @ 100° C. | ~7.5 | 12.7 | 2.64 | 4.8 |
| H | Silica 600 @ 200° C. | ~30 | 4.03 | 0.061 | 6.6 |
| H | PI/PSx/Silica @ 190° C. | ~30 | 21.2 | 1.8 | 11.8 |

REFERENCES IN TABLE 2

A T. M. Gur, Permselectivity of zeolite filled polysulfone gas separation membranes, J. Membrane Sci. 93 (1994) 283–298.

B J. M. Mohr et al, Surface fluorination of polysulfone asymmetric membranes and films, J. Membrane Sci. 56 (1991).

C J. S. McHattie, W. J. Koros, and D. R. Paul; Gas transport properties of polysulfones. I. Role of symmetry of methyl group placement on bisphenol rings, Polymer, 32 (1991) 840.

D G. Hartel et al, Separation of a $CO_2/H_2$ gas mixture under high pressure with polyethylene terephthalate membranes, J. Membrane Sci. 113 (1996), 115–120.

E A. Alentiev et al, Gas permeation properties of phenylene oxide polymers, J. Membrane Sci., 138 (1998) 99–107.

F C. Joly et al, Sol-gel polyimide-silica composite membrane; gas transport properties, J. Membrane Sci. 130 (1997) 63–74.

G M. G. Suer et al, Gas permeation characteristics of polymer-zeolite mixed matrix membranes, J. Membrane Sci. 91, (1994) 77–86.

H R. M. de Vos, H. Verweij, Improved performance of silica membranes for gas separation, J. Membrane Sci. 143 (1998) 37–51.

The comparison in Table 2 is indicative of a superior performance of the membranes prepared with the method of the present invention. Typical selectivities of the polymeric membranes as shown in Table 2 are between 2 and 3. The highest $H_2/CO_2$ ISF value for polymeric membranes reported in the literature was 11.8 using an alloy membrane of polyimide and polysiloxane with silica loading. The above value can be compared with the highest ISF value of 36 observed by the present inventors. In addition, the permeability coefficient of 14.4 Barrer, reported is greater or comparable with most of the literature results.

Figure 4:
FIG. 4 is an FTIR spectrum of PsfCHO-zeolite 3A film coupled with aminopropyltrimethoxysilane.
Figure 5:
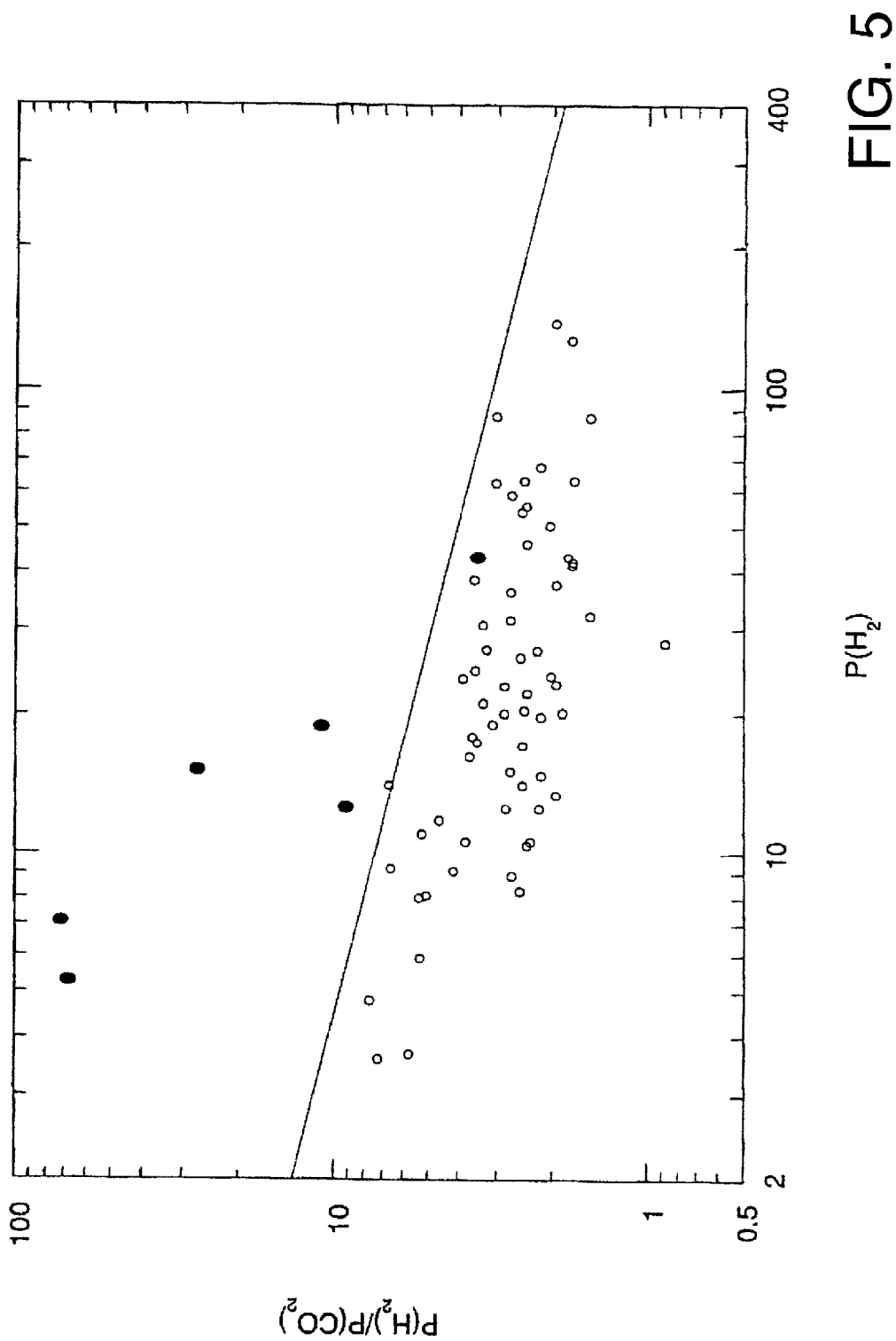
FIG. 5 is a graph based on the results of permeation tests on various membranes.

The gas permeation test results for the membrane of Example 2 are well above the "upper-bound" performance limit shown in FIG. 4. In FIG. 4, all of the points (small circles) below the "upper-bound" performance limit are literature data. All of the black filled points were obtained using the membranes of Example 2. All gas permeation measurement were taken at room temperature, approximately 22° C. The results of two permeation tests are as follows:

|  | $P(H_2)$ barrer | $P(CO_2)$ barrer | $\alpha H_2/CO_2$ (ideal gas selectivity) |
| --- | --- | --- | --- |
| First permeation test | 7.05 | 0.098 | ~72 |
| Second permeation test | 5.26 | 0.077 | ~68 |

A series of strong, flexible and solvent resistant flat-sheet composite membranes were prepared containing various loadings of zeolite covalently bonded to a polysulfone continuous phase. From the results of pure gas permeabilities of hydrogen and carbon dioxide, zeolite 3A has the role of a molecular sieve for hydrogen in zeolite filled membranes. The kinetic diameter of $H_2$ is smaller than the 3 Å pore and can pass through the zeolite structure, but the larger diameter $CO_2$ cannot enter the pore and must pass through the polymer matrix.

From permeability measurements of comparative membranes, it is apparent that enhanced ideal separation factor (ISF) for $H_2/CO_2$ is achieved only when zeolite particles are covalently bound to the polymer matrix. A common phenomenon in glassy polymer-zeolite composite membranes is that a significant enhancement of permselectivities is not achieved because of the occurrence of void spaces between the polymer phase and the particles. The process of the present invention for binding zeolite through a coupling agent covalently bonded through imine groups to aldehyde functionalized polysulfone is highly effective for reducing or eliminating void cavities around particles by creating a continuous network.

In order to achieve high $H_2/CO_2$ permselectivity, the hydrogen must pass predominately through the zeolite and the carbon dioxide predominately through the polymer matrix. Zeolite loading in the composite membrane must be high to enhance this effect. The polymer solution viscosity must also be high enough to impede zeolite sedimentation during membrane preparation.

One of the most effective membrane formulations showing significant enhancement of ISF for $H_2/CO_2$ is a composite membrane containing 41% zeolite loading. The membrane had a ISF value of 36 compared with 1.6 to 2.8 for Psf film, without a decrease in $H_2$ permeability coefficient. The high ISF value suggests that the individual zeolite particles are well encapsulated and bonded with the polymeric continuous phase. At a higher zeolite loading of 50%, the ISF value decreased to 12.7, but the $H_2$ permeability coefficient greatly increased to 135 Barrer. This is suggestive of incomplete coating and bonding of all the zeolite particles with the polymeric phase.

Thus, it has been shown that significantly enhanced ideal separation factor can be achieved from glassy polymer polysulfone—zeolite defect-free composite membranes using the process of the present invention.

It will be appreciated by those skilled in the art that the invention is also applicable to the separation of other gas pairs of different molecule sizes, and to other polymers.

The membranes described above used bonded zeolite 3A, which has a pore diameter of just under 3 Angstroms. The gases tested at room temperature have been primarily hydrogen and carbon dioxide, because the two gases are difficult to separate using conventional polymeric materials, and the kinetic diameter of $H_2$ is smaller that 3 Angstroms, while $CO_2$ is larger. Very high ideal separation factors of $H_2/CO_2$ have been achieved, as high as 36, with permeability coefficient of the combined matrix of 14 Barrer. The 3A mixed matrix membrane also permeates helium very well, but has negligible permeability of $O_2$ and $N_2$. Therefore, the 3A membranes have high selectivity towards $H_2$ and He, and allow only low permeation of gases with kinetic size greater than 3 Angstroms. Robeson published one of the "upper-bound" lines, in this case for $He/N_2$. One membrane of the present invention has a He permeability coefficient of ~30 Barrer, and negligible $N_2$ permeability coefficient (separation factor 30/~0=high separation factor). The published "upper-bound" for this gas pair is ~250, which would require a $N_2$ permeability coefficient of 0.12 for a He coefficient of 30. The permeability coefficient of the invented membrane was less than 0.12, and could not be accurately measured on the experimental equipment.

We claim:

1. A composite gas separation membrane comprising a polymer covalently bonded to a zeolite.

2. The membrane of claim 1, wherein the polymer is bonded to the zeolite by a coupling agent capable of bonding with the polymer and the zeolite.

3. The membrane of claim 2, wherein the polymer polysulfone aldehyde is bonded to zeolite 3A by a coupling agent capable of bonding with the zeolite and with the polysulfone alderhyde.

4. The membrane of claim 3, wherein the coupling agent is aminopropyltrimethoxysilane.

5. The membrane of claim 4, including 5 to 7 wt % of polysulfone aldehyde and 33 to 50 wt % of zeolite based on the total weight of the membrane exclusive of coupling agent.

6. The membrane of claim 5, including 5 to 7 wt % of polysulfone aldehyde and 41% zeolite, based on the total weight of the membrane exclusive of coupling agent.

7. The membrane of claim 1, wherein the polymer is polysulfone bonded to the zeolite by a coupling agent capable of bonding with the zeolite and with the polysulfone.

8. A process for preparing a composite glassy polymer zeolite gas separation membrane comprising the step of covalently bonding zeolite particles to the polymer.

9. The process of claim 8, wherein bonding is effected by preparing a solution of the polymer, preparing a dispersion of ground zeolite particles; and mixing the dispersion with the polymer solution and a coupling agent capable of covalently bonding the zeolite particles to the polymer.

10. The process of claim 9, wherein the polymer is polysulfone and the zeolite is zeolite 3A.

11. The process of claim 9, wherein the polymer is polysulfone aldehyde and the particles are zeolite 3A.

12. The process of claim 11, wherein the coupling agent is aminopropyltrimethoxysilane.

13. The process of claim 8, wherein the polymer is polysulfone aldehyde and bonding is effected by preparing and refluxing a suspension of ground zeolite and coupling agent in a solvent; adding a solution of polysulfone aldehyde to the mixture thus produced, casting the solution onto flat moulds; and drying the resulting film to yield the membrane.

14. The process of claim 13, wherein drying is effected in a first drying step at room temperature in an inert atmosphere, and then, in a second drying step, at 75° C. for a first period of time and, in a third drying step at 60° C. for a second period of time.

15. The process of claim 14, wherein each said first, second and third drying steps lasts twenty-four hours.

* * * * *